April 25, 1939.     F. H. LE JEUNE     2,155,667
WHEEL
Original Filed Aug. 15, 1932    2 Sheets-Sheet 1
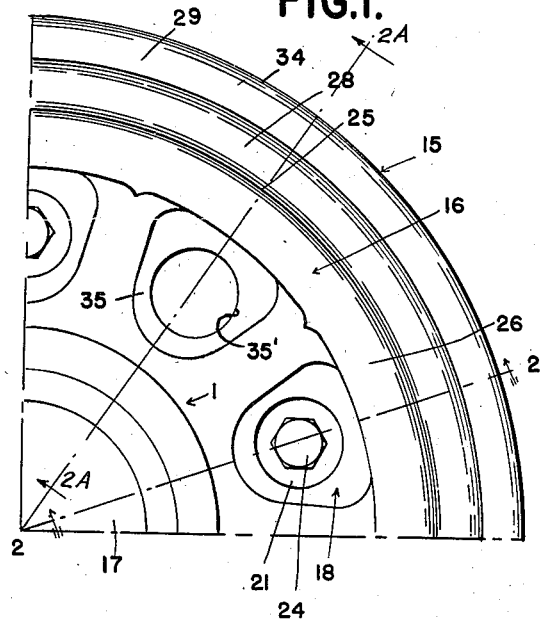
FIG. 1.
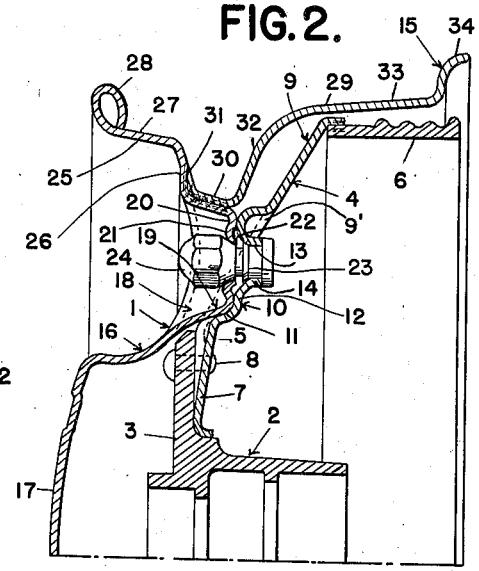
FIG. 2.
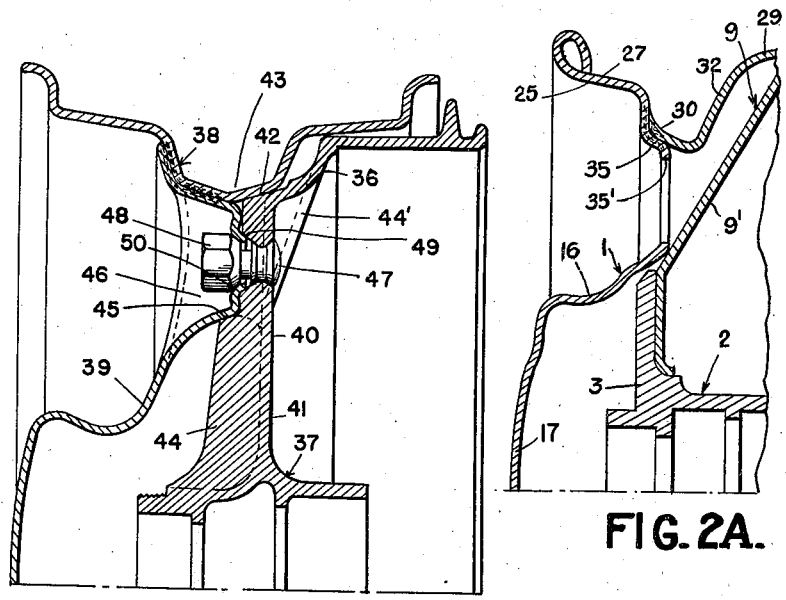
FIG. 3.
FIG. 2A.
INVENTOR
FRANK H. LE JEUNE
BY
ATTORNEYS April 25, 1939.   F. H. LE JEUNE   2,155,667
WHEEL
Original Filed Aug. 15, 1932   2 Sheets-Sheet 2

INVENTOR
FRANK H. LE JEUNE
BY
ATTORNEYS

Patented Apr. 25, 1939

2,155,667

UNITED STATES PATENT OFFICE 2,155,667

WHEEL

Frank H. Le Jeune, Detroit, Mich., assignor to Kelsey-Hayes Wheel Company, Detroit, Mich., a corporation of Delaware Original application August 15, 1932, Serial No. 628,930. Divided and this application August 12, 1935, Serial No. 35,855

5 Claims. (Cl. 301—6)

The invention relates to wheels and refers more particularly to wheels for use with motor vehicles.

One of the objects of the invention is to provide an improved vehicle wheel which is simple in construction but sufficiently strong to withstand all stresses to which it may be ordinarily subjected in use. Another object is to provide a wheel which is particularly adapted to be made pleasing and ornamental in appearance. A further object is to so construct the wheel that it may be readily mounted or demounted. A still further object is to so construct and mount the wheel that provision is made for ventilation of the brake drum.

These and other objects of the invention will become apparent from the following description, taken in connection with the accompanying drawings, in which Figure 1 is a front elevation of a wheel showing an embodiment of my invention;

Figures 2 and 2A are cross sections on the lines 2—2 and 2A—2A respectively of Figure 1;

Figure 3 is a view similar to Figure 2 showing another embodiment of my invention;

Figure 6:
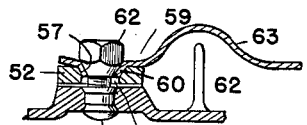
Figure 6 is a cross section on the line 6—6 of Figure 4.

The motor vehicle wheel shown in Figures 1 and 2 has the wheel body 1, which is adapted to be mounted upon the hub 2. This hub has the fixed radially extending annular flange 3 to which is fixedly secured the brake drum 4 which, as shown in the present instance, is a composite brake drum having the sheet metal back or web 5 and the annular brake engaging member 6, which may be formed of suitable material such as iron or steel and which, in the present instance, is formed of special high carbon steel. The back or web has the central portion 7, which is preferably permanently secured to the rear or inboard side of the fixed flange 3 by suitable means, such as the rivets 8 and the outer portion 9, which is inclined rearwardly or toward the inboard side. This outer portion is formed with the annular series of recesses 10 radially outwardly beyond the fixed flange 3, each recess having the tapered seat 11 and the radially extending wall 12, which latter is provided with the axially extending opening 13 surrounded by the cylindrical flange 14.

The wheel body comprises the rim member 15 and the disk member 16. The disk member is formed of sheet metal and has the central portion 17 which extends over and conceals the hub member 2 and its fixed flange 3. This disk member also has the annular series of depressions 18 which are adapted to extend into the recesses 10 and have the tapered portions 19 for engagement with the tapered seats 11 and the radially extending portions 20 for abutting the radially extending walls 12 in zones spaced from and encircling the holes 13. As shown in the present instance, the depressions are centrally bossed at 21 and these bosses are provided with holes surrounded by the frusto-conical flanges 22. Bolts 23 are permanently secured in the holes 13 registering with the frusto-conical flanges and these bolts extend through these flanges and are detachably engaged by the nuts 24, which have correspondingly tapered noses for engaging the flanges and thereby detachably securing the wheel body to the brake drum or upon the hub.

As shown in the present instance, the front or outboard portion of the rim member 15 is formed by the integral peripheral portion 25 of the disk member 16. This peripheral portion has the radially outwardly extending annular wall 26, the laterally extending annular ledge 27 and the radially outwardly extending annular tire retaining flange 28. 29 is a sheet metal ring or annulus at the rear or inboard side of the peripheral portion 25 and having the inner annular portion 30 encircling the outer walls of the depressions 18 and terminating in the tapered radially outwardly extending edge portion 31 at the rear or inboard side of the wall 26. The portions 30 and 31 are permanently secured to the outer wall portions of the depressions 18 and the wall 26 by suitable means, such as welds. The ring or annulus has the radially outwardly extending annular wall 32 leading from the portion 30, the laterally extending annular ledge 33 and the radially outwardly extending annular tire retaining flange 34, these parts being radially spaced from the brake drum.

The portions of the disk member 16 between the central portion 17 and the peripheral portion 25 are provided with the relatively shallow depressions 35 having the holes 35', these depressions 35 being between the depressions 18 and these holes 35' having their axes on the same circle line as the axes of the frusto-conical flanges 22 and the holes formed thereby. These holes 35' provide for circulation of air between the brake drum and the rim member, the outer portion 9 of the back or web of the brake drum being provided with the hollow reinforcing ribs 9' between the recesses 10 and registering with the holes 35'.

Figure 3 discloses another modification in which the brake drum 36 is formed integral with the hub member 37 and the rim member 38 of the wheel body is formed separately from but permanently secured to the disk member 39 of the wheel body. More specifically, the back or web 40 of the brake drum merges into the fixed or radially extending flange 41 of the hub member. This back or web preferably has the annular series of tapered seats 42 which are concentric and have the same radius and which are adapted for engagement by a correspondingly tapered portion of the annular wall 43 of the rim member. The back or web 40 is provided with the integral reinforcing ribs 44' which are hollow and extend radially between the seats 42. The fixed flange of the hub member is reinforced by the radially extending ribs 44 which terminate at their outer ends in the tapered seats 45 and these tapered seats with the back or web form, in effect, an annular series of recesses which are engageable by the depressions 46 formed in the sheet metal disk member 39. The wheel body is detachably secured upon the hub member by the bolts 47 and the nuts 48, the latter having tapered noses for engaging the tapered or frusto-conical flanges 49 in the depressions and these flanges in turn engage the walls of the tapered recesses 50 formed in the back or web of the brake drum. The tapered seats 42 are located radially outwardly beyond the bolts, there being one seat beyond each bolt.

The disk member 39 is constructed in the same manner as the disk of Figures 1 and 2 to provide for the passage of air therethrough and passage of this air between the brake drum and the rim member, the hollow reinforcing ribs of the brake drum forming passageways for the air between the seats engaged by the rim member.

Figure 4:
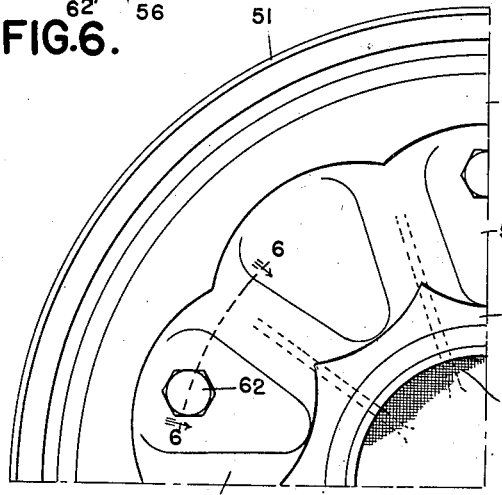
Figures 4 and 5 are views similar to Figures 1 and 2 respectively, showing another embodiment of my invention.
Figure 5:
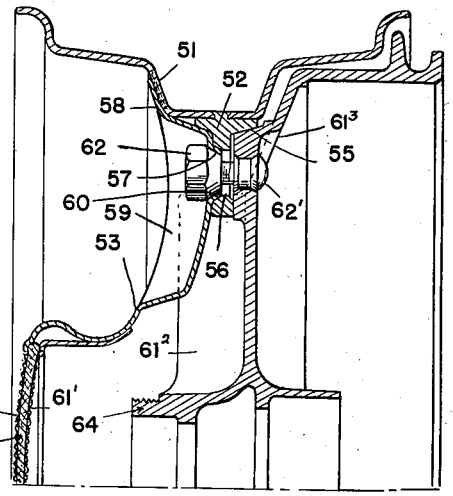

Figures 4, 5 and 6 disclose another modification of the wheel in which the wheel body comprises the tire carrying rim member 51, the clamps 52 secured to and extending radially inwardly from the base of the well of the rim member and the sheet metal disk member 53. The clamps have the annular series of tapered seats 55 upon the back or web of the brake drum. These clamps extend at the front or outboard side of the back or web and have the axially extending holes 56 therethrough which at their front or outboard ends are flared to provide the tapered seats 57. The disk member 53 has the outer peripheral portion 58 which is permanently secured to the rim member 51 as by being welded to the front or outboard wall of its annular well. This disk member has its intermediate portion formed with the depressions 59 with alternate depressions provided with the frusto-conical or tapered flanges 60 for engaging the tapered seats 57. This disk member also has its central portion formed to filter the air which passes through the central portion and between the disk and rim members and the brake drum to provide for ventilation of the latter. To facilitate the passage of air, the brake or web has the integral radially extending hollow reinforcing ribs 61³ between the seats for the clamps. More particularly, the central portion comprises the air filtering material 61 and the fine screen 61' on opposite sides of the filtering material. 61² are radially extending ribs upon and preferably integral with the back or web of the brake drum and the hub and extending within the spoke simulating portions of the disk member between the depressions 59, these ribs serving as fan blades to effect flow of the air. 62 are nuts threaded upon the bolts 62' and having tapered noses fitting the tapered flanges 60 and detachably securing the wheel body upon the hub.

Figure 7:
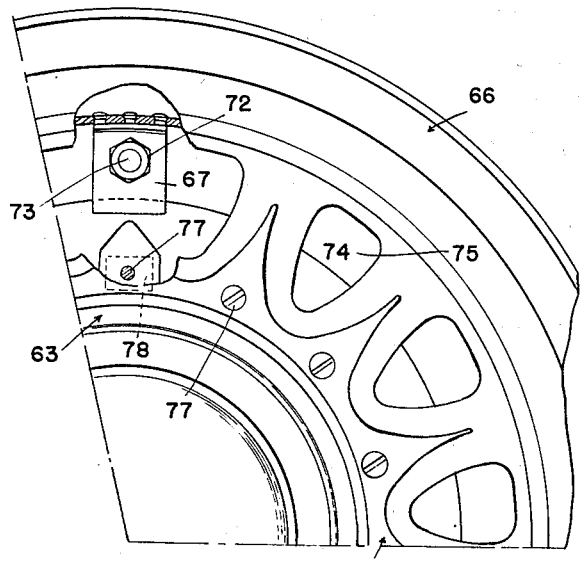
Figures 7 and 8 are views similar to Figures 1 and 2 respectively, showing another embodiment of my invention, Figure 7 being partly in section.
Figure 8:
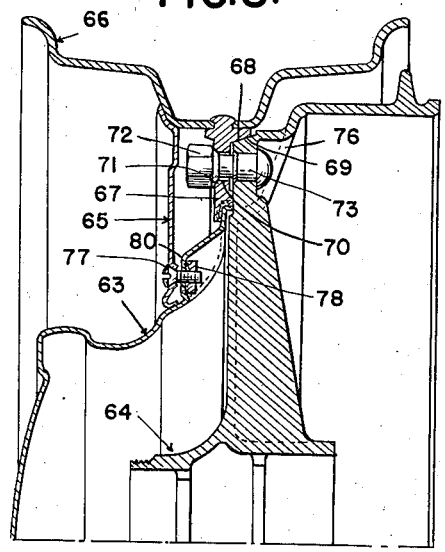

In the modification shown in Figures 7 and 8, the disk member is formed of the central disk 63 extending over the hub 64 and the intermediate disk 65 extending between the central disk and the tire carrying rim member 66. The central disk is preferably formed of sheet metal and is permanently secured as by welding to the inner portions of the clamps 67 which extend radially inwardly from and are permanently secured to the rim member. These clamps, as in the previous modifications, have the tapered portions 68 for engaging the annular series of tapered seats 69 upon the back or web of the brake drum and also have the axially extending holes 70 terminating at their front or outboard ends in the tapered seats 71. These seats are engaged by the nuts 72 threaded upon the bolts 73, the latter being permanently secured to the back or web of the brake drum. The intermediate disk 65 is a ring preferably formed of sheet metal and has portions extending over and concealing the nuts 72. This intermediate disk also has between these concealing portions other portions which may be provided with suitable configurations and which, as shown in the present instance, are depressions 74 having the holes 75 therethrough so that air may circulate through the wheel body and between the wheel body and more particularly the rim member and the brake drum, the latter, as shown, having the generally radially extending hollow reinforcing ribs 76 facilitating the air circulation. The intermediate disk 65 is detachably secured in place by means of the screws 77 which are adapted to threadedly engage the plates 78, or both these plates and the bosses 80 formed in the central disk 63. The plates are permanently secured to the rear or inboard sides of the bosses as by welding.

From the above description, it will be readily seen that I have provided a construction of motor vehicle wheel which is simple and strong and which may have a number of configurations or contours to secure different appearances and which provides for circulation of air across the outer surface of the brake flange of the brake drum.

The present application is a division of my copending application Serial No. 628,930, filed August 15, 1932, upon Wheel.

What I claim as my invention is:

1. In a wheel, the combination of a hub member, wheel supporting means on said hub member provided with a tapered seat, and a wheel unit comprising a rim member supported upon said seat and a disk member permanently secured to said rim member and detachably secured to said supporting means.

2. In a wheel, the combination of a hub member, wheel supporting means on said hub member provided with a tapered seat, and a wheel unit comprising a rim member having a tapered portion engageable with said seat and a disk member permanently secured to said rim member and detachably secured to said supporting means.

3. In a wheel, the combination of a hub member, a brake drum integral with said hub member and having a tapered seat and an annular series of recesses, and a demountable wheel structure comprising a rim member supported upon said seat and a disk member secured to said rim member and having depressions extending into said recesses.

4. In a wheel, the combination of a hub member, a brake drum on said hub member and having an annular series of seats and generally radially extending hollow ribs intermediate said seats, and a demountable wheel structure comprising a rim member supported upon said seats and a disk member secured to said rim member and detachably secured to said brake drum intermediate said ribs for clamping said rim member upon said brake drum, said disk member being provided with an opening therethrough for the passage of air.

5. In a wheel, the combination of a hub member, wheel supporting means on said hub member having an annular series of recesses, and a demountable wheel structure secured to said supporting means and comprising a rim member and a disk member secured to the rim member and having depressed portions extending into said recesses, said depressed portions having holes therein and means extending through the holes of said depressed portions for securing the demountable wheel structure to the supporting means, said demountable wheel structure having other apertured depressed portions between the depressed portions aforesaid, said second-named depressed portions having a depth less than the distance from the demountable wheel structure to the supporting means to provide a space between the demountable wheel structure and the supporting means for the circulation of air.

FRANK H. LE JEUNE.